(12) United States Patent
Schneider

(10) Patent No.: US 7,411,149 B2
(45) Date of Patent: Aug. 12, 2008

(54) INVERTER POWERED PLASMA CUTTING SYSTEM WITH FIXED GAS FLOW CONTROL

(75) Inventor: Joseph C. Schneider, Menasha, WI (US)

(73) Assignee: Illinoise Tool Works Inc., Glenview, IL (US)

( * ) Notice: Subject to any disclaimer, the term of this patent is extended or adjusted under 35 U.S.C. 154(b) by 60 days.

(21) Appl. No.: 11/278,335

(22) Filed: Mar. 31, 2006

(65) Prior Publication Data

US 2007/0235428 A1  Oct. 11, 2007

(51) Int. Cl.
*B23K 10/00* (2006.01)
(52) U.S. Cl. .................. 219/121.54; 219/121.55; 219/121.51; 219/121.39; 219/75; 215/111.21
(58) Field of Classification Search ............. 219/121.36, 219/121.59, 121.39, 121.44, 121.48, 121.54, 219/121.55, 75, 121.57, 74; 315/111.21; 313/231.31, 231.41

See application file for complete search history.

(56) References Cited

U.S. PATENT DOCUMENTS

| 5,189,277 | A | * | 2/1993 | Boisvert et al. | ........ 219/121.54 |
| 5,357,076 | A | * | 10/1994 | Blankenship | .......... 219/121.54 |
| 6,057,524 | A | * | 5/2000 | Katooka et al. | ........ 219/121.54 |
| 6,236,013 | B1 | * | 5/2001 | Delzenne | ............... 219/121.54 |
| 7,176,404 | B2 | * | 2/2007 | Herres | ...................... 219/121.5 |
| 2001/0042736 | A1 | * | 11/2001 | Schneider et al. | ...... 219/121.55 |

OTHER PUBLICATIONS

Hobart Welding Products AirForce 250/AirForce 250A And Ice-12C Torch Pwner's Manual, Apr. 2002.
Hobart Welding Products AirForce 250A And Ice-12C Torch Owner's Manual, Oct. 2002.
Hobart Welding Products AirForce 250A And Ice-12C Torch Owner's Manual, Jan. 2003.

* cited by examiner

*Primary Examiner*—Mark H Paschall
(74) *Attorney, Agent, or Firm*—Ziolkowski Patent Solutions Group, SC

(57) ABSTRACT

A lightweight and compact plasma cutting system includes a power source having an inverter and a non-adjustable regulator enclosed within the power source. The inverter is configured to generate a power signal suitable for a plasma arc process and the non-adjustable regulator is preconfigured to deliver a fixed gas flow to a plasma torch for the plasma arc process.

18 Claims, 3 Drawing Sheets

INVERTER POWERED PLASMA CUTTING SYSTEM WITH FIXED GAS FLOW CONTROL

BACKGROUND OF THE INVENTION

The present invention relates generally to plasma cutting systems and, more particularly, to an inverter powered plasma cutting system with automatic gas flow control.

Plasma cutting is a process in which an electric arc and plasma gas are used to cut or gouge a workpiece. Plasma cutters typically include a power source, a gas supply, such as compressed air, and a torch. The torch is constructed to create and maintain the plasma arc. To generate the plasma cutting power, a power source receives an input voltage from a transmission power receptacle or generator and provides output power to a pair of output terminals. One of the output terminals is connected to an electrode and the other is connected to the workpiece. An air supply is used with most plasma cutters to carry and propel the arc to the workpiece and assist in cooling the torch.

Prior to operation of the plasma cutting system, an operator must manually set a regulator of the air flow system such that a desired air flow is provided during operation of the plasma cutting system. The air flow is set by the operator to correlate with the intended plasma cutting process. That is, the rate of air flow delivered to the plasma torch during a plasma arc process varies depending on the type of plasma processing. For example, the air flow required for plasma cutting may differ from that needed for plasma gouging. Although such in-field adjustment of the air flow provides an operator with more precision control of the air flow rate, such a construction is not without its drawbacks.

Operator control of the air flow invariably presents the opportunity for improper setting of the air flow control, especially by inexperienced operators. For example, in a dynamic work environment, an operator may be required to perform gouging and cutting operations in a relatively continuous manner. It may not be practical for the operator to sequentially perform all of the desired cutting processes and then all of the desired gouging process, or vice verse. The operator may be required to sequentially mix a plurality of cutting processes and a plurality of gouging processes. Suspending one process to reconfigure the power source for another process is time consuming and results in overall process inefficiency. In addition to configuring the air flow for the intended process, the operator must also configure the power source to deliver a desired power signal suitable for the intended process.

In addition to the inefficiency associated with the repetitive reconfiguring of the power source to deliver the appropriate power signal/air flow as dictated by the intended plasma process, the means for allowing operator control of the air flow complicates power source construction and expense. Generally, an adjustable air flow control must be made readily accessible to the operator. This is frequently achieved by passing a control dial of a regulator through an opening formed in the housing. Not only does the operator variable flow control occupy space in the interior of the power source thereby increasing the overall size of the plasma cutting device, the control must be placed on the front panel, thereby further limiting the internal configuration options. Alternatively, the such regulators have been located external to the power source. Obviously, there are drawbacks to these systems such as enabling the possibility of unregulated air to the power source if the regulator is bypassed, and simply requiring one more apparatus to the overall system.

In conjunction with the operator variable flow control, a gauge is also required to provide the operator with feedback as to the air flow setting. The pressure gauge must also be fluidly connected to the gas system and also requires another opening formed preferably in the front panel of the power source.

Further complicating construction of the plasma arc power sources, the gas must be allowed to flow without plasma arc power to allow the operator to accurately set the adjustable gas flow. Such operation requires that the power source have an operating mode wherein the plasma forming gas is allowed to flow but the power supply is disabled thereby preventing inadvertent formation of a plasma arc when the operator is setting the desired plasma gas flow. Providing such an operating mode further complicates the construction of the power source and increases the complexity of the device and the operation thereof.

It would, therefore, be desirable to design a plasma cutting system with simplified construction, operation, and control of the gas system.

BRIEF DESCRIPTION OF THE INVENTION

The present invention provides a lightweight and compact plasma cutting system that overcomes the aforementioned drawbacks. The plasma cutting system includes a power source having an inverter and a non-adjustable regulator operatively connected to the power source. The inverter is configured to generate a power signal suitable for an operator selected plasma arc operating mode and the non-adjustable regulator is configured to automatically set a fixed gas flow to a plasma torch depending on a selected operating mode.

Therefore, in accordance with one aspect of the present invention, a plasma cutting power source is disclosed. The plasma cutting power source includes an inverter which is disposed within a housing and configured to receive an input power and generate a plasma cutting power from the input power. The plasma cutting system includes a gas path having an inlet to receive compressed gas and an outlet connected to a torch. A non-adjustable regulator is fluidly connected in the gas path and enclosed within the housing. The non-adjustable regulator is configured to provide a fixed preset gas flow to the outlet.

According to another aspect of the present invention, a plasma cutting system having an inverter based power source configured to generate a plasma arc power is disclosed. The inverter and a gas delivery system is disposed within an enclosure. The gas delivery system is configured to provide a fixed regulated gas flow. A plasma torch is operatively connected to the power source and the gas delivery system and the gas delivery system is constructed to provide gas flow to the plasma torch when plasma arc power is provided to the plasma torch.

According to a further aspect of the present invention, a method of controlling a plasma cutting system is disclosed. The method includes the steps of powering an inverter to generate a plasma arc power and receiving an operator desired plasma process request, and then setting a fixed gas flow from a gas source to a plasma torch wherein the fixed gas flow is statically regulated between the gas source and the plasma torch.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
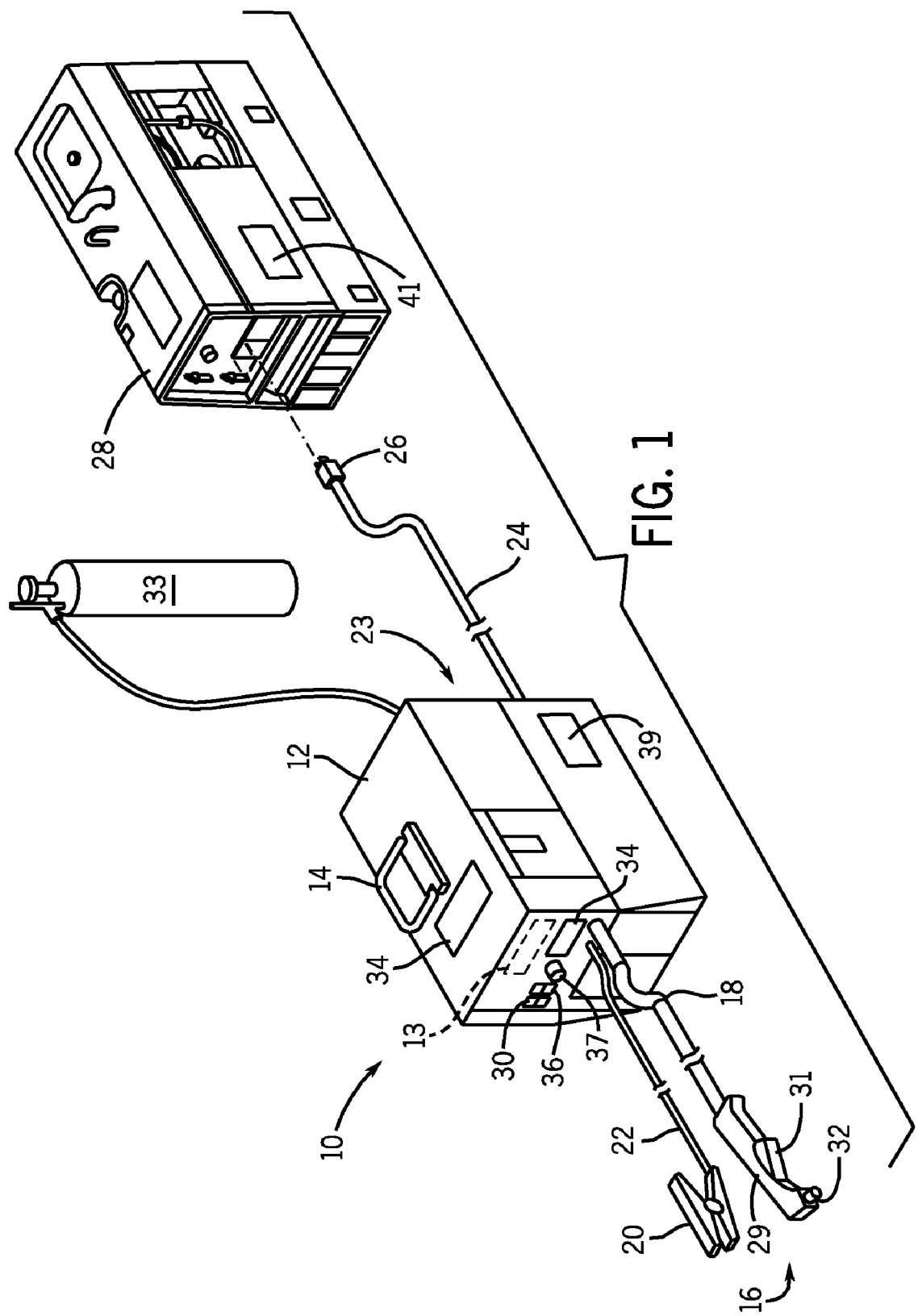
FIG. 1 is a perspective view of a plasma cutting system according to the present invention.

FIG. 1 shows a plasma cutting system 10 according to the present invention. Plasma cutting system 10 is a high voltage system with open circuit output voltages that typically range from approximately 230 Volts Direct Current (VDC) to over 300 VDC. Plasma cutting system 10 includes a power source 12 to condition raw power and generate a power signal suitable for plasma cutting applications. Power source 12 includes a processor/controller 13 that receives operational feedback and monitors the operation of a plasma cutting system 10. Power source 12 includes a handle 14 to effectuate transportation from one site to another. Connected to power source 12 is a torch 16 via a cable 18. Cable 18 provides torch 16 with power and compressed air or gas, and also serves as a communications link between torch 16 and power source 12. Torch 16 includes a handle portion 29, or torch body, having a trigger 31 thereon and work tip 32 extending therefrom. Although shown as attached to torch 16, it understood and within the scope of the claims that trigger 31 be connected to power source 12 or otherwise remotely positioned relative to torch 16.

Also connected to power source 12 is a work clamp 20 which is designed to connect to a workpiece (not shown) to be cut or gouged. Work clamp 20 provides a ground or return path to power source 12. Connecting work clamp 20 to power source 12 is a cable 22 designed to provide the return path, or grounding path, for the cutting current from torch 16 through the workpiece and work clamp 20. Extending from a rear portion 23 of power source 12 is a power cable 24 having a plug 26 for connecting power source 12 to either a portable power supply 28 or a transmission line power receptacle (not shown).

Power source 12 includes a limited number of inputs such as an ON/OFF switch 30, an optional mode selector switch 36, and a desired amperage control 37. Power source 12 can also be constructed to include an optional display 34 configured to communicate power source operational information to an operator. The optional mode selector switch 36 and amperage control 37 are connected to controller 13 and allow an operator to configure power source 12 to provide the outputs necessary for a desired mode of operation. For example, it is envisioned that optional mode selector switch 36 configures the power source to provide the arc power and gas flow necessary for either plasma cutting or gouging. Amperage control 37 allows an operator to select a desired arc current independent of the plasma process selected. Accordingly, an operator can configure the plasma cutting system to provide a power signal and gas flow necessary for a cutting process or a gouging process.

To effectuate cutting, torch 16 is placed in close proximity to a workpiece connected to clamp 20. A user then activates trigger 31 on torch 16 to deliver electrical power and compressed gas to work tip 32 of torch 16 to initiate a pilot arc and plasma jet. Shortly thereafter, a plasma arc is generated as the user moves the torch to the workpiece. The arc transfers from the electrode to the workpiece through the tip. The user may then perform the desired plasma effectuated processing of the workpiece by moving torch 16 across the workpiece.

Gas is supplied to torch 16 from a pressurized gas source 33, either from an internal compressor 39, or an external air compressor 41. Regardless of the source of the plasma supporting gas, as discussed further with respect to FIG. 3, power source 12 includes a gas system which is configured to deliver a fixed regulated gas flow to the plasma torch without operator manipulation or adjustment of a regulator.

Figure 2:
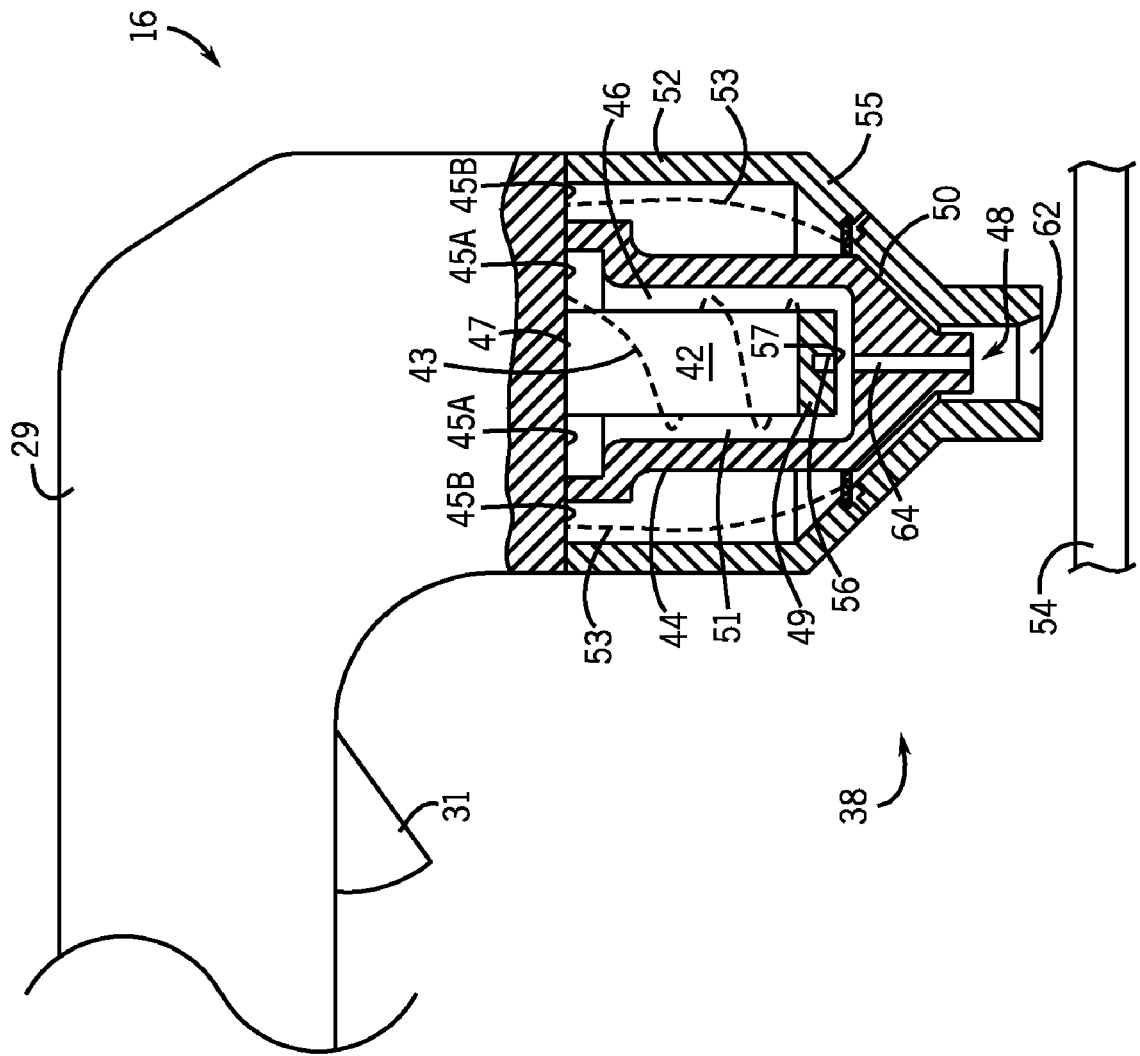
FIG. 2 is a partial cross-sectional view of the plasma torch of the plasma system shown in FIG. 1.

Referring now to FIG. 2, a consumable assembly 38 of plasma cutting torch 16 is shown in partial cross-section. Consumable assembly 38 is attached to handle portion 29 of torch 16 and includes a cathodic component, or electrode 42, and an anodic component, or tip 44.

Electrode 42 is centrally disposed within a gas chamber 46 and has a base 47 that electronically communicates with power source 12 through handle portion 29 of torch 16. Electrode 42 includes an electrode tip 49 at an opposite end 51 from base 47 of electrode 42.

A plasma forming gas 43 is communicated from power source 12 through handle portion 29 of plasma torch 16, is passed through a swirl ring (not shown), and delivered to gas chamber 46 from a plurality of passages 45A. Gas 43 exits gas chamber 46 through an end portion 48 of tip 44. Another plurality of gas passages 45B deliver a shielding gas 53 to a shielding gas passage 50 extending between tip 44 and a cup or cap 52 and a shield 55 connected to cap 52 of consumable assembly 38. Shielding gas 53 is also communicated to plasma torch 16 from the gas system of power source 12.

During a cutting process, a plasma jet passes from torch 16 through end portion 48 of tip 44 and exits torch 16 through a tapered opening 62 of shield 55. A flow of shielding gas also exits torch 16 through opening 62 of shield 55 and generally encompasses the plasma jet. End portion 48 of tip 44 and opening 62 cooperate to direct the plasma flow from a plasma chamber 64 into a concentrated, highly charged, plasma flow.

Plasma chamber 64 is formed in the space between electrode 42 and end portion 48 of tip 44.

A pilot arc is generally formed in plasma chamber 64 between electrode 42 and end portion 48 of tip 44, collectively referred to as the contacts. The flow of gas through the torch is converted to a plasma jet initiated by the pilot arc. As shown, electrode 42 is movable relative to tip 44 such that electrode 42 is in contact with tip 44 during an idle or non-operating mode of plasma torch 16. Actuation of trigger 31 initiates a current and an air flow. The air flow separates electrode 42 and tip 44 and cooperates with the current to form the pilot arc between electrode 42 and tip 44. Gas 43 passing from gas chamber 46 directs the pilot arc through nozzle portion 48 of tip 44 and opening 62 of shield 55 toward a workpiece 54.

It is understood and within the scope of the appending claims that the torch could be constructed to form the pilot arc through other means than the contact/separation means shown. For example, the plasma torch could generate the pilot arc by what are commonly referred to as high frequency and/or high voltage starting techniques. Such torches do not necessarily include movable parts but generate a pilot arc with an electrical signal sufficient to traverse the gap between the cathodic and the anodic components of the torch.

During a cutting operation, the cutting arc initiated from the pilot arc is maintained between workpiece 54 and an insert 56 of electrode 42. The cutting arc swirls about an end 57 of insert 56 and travels to workpiece 54 in the plasma flow from torch 16. Insert 56 is constructed to be conductive and to resist deterioration associated with the high temperature and power of the arc which swirls thereabout. Insert 56 exhibits certain preferred electrical, thermal, and chemical properties and is preferably formed of a hafnium or a zirconium based material.

Figure 3:
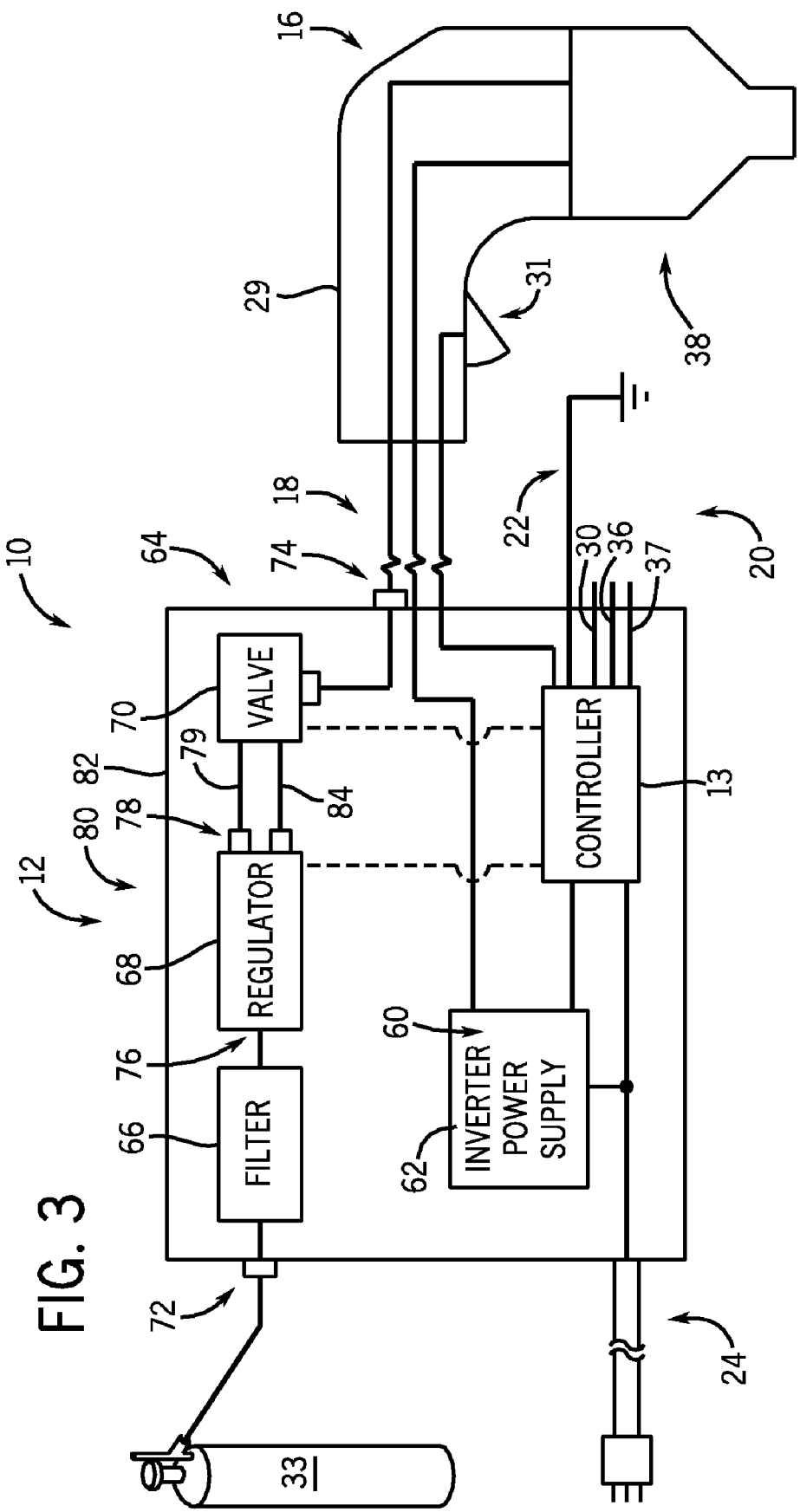
FIG. 3 is a block diagram of the major components of plasma cutting system shown in FIG. 1.

A graphical representation of the major components of power source 12 is shown in FIG. 3. Power source 12 is receives an input power from power cable 24 and directs the input power to a power supply 60 having an inverter 62. Controller 13 is connected to inputs 30, 36, 37 and instructs power supply 60 to generate a plasma power in accordance with the inputs. Controller 13 is also connected to trigger 31 of plasma torch 16 via cable 18 such that when trigger 31 is actuated, power source 12 communicates the plasma power generated by inverter 62 of power supply 60 to plasma torch 16.

Power source 12 also includes a gas delivery system 64 having a filter 66, a non-adjustable regulator 68, and a valve 70 operatively connected between a gas inlet 72 and a gas outlet 74 of power source 12. Gas inlet 72 is fluidly connected to gas source 33. Filter 66 removes any contaminants that may be carried with the gas flow from gas source 33 and inhibits pollutant degradation of gas delivery system 64. Non-adjustable regulator 68 includes an inlet 76 and an outlet 78 and is constructed to regulate the flow of gas through gas system 64 at a fixed rate.

Non-Adjustable regulator 68 is contained entirely within a perimeter 80 of a housing 82 of power source 12. Non-Adjustable regulator 68 is preset to provide a fixed gas flow at outlet 78. That is, the flow of gas provided at outlet 78 of non-adjustable regulator 68 is fixed and is non-adjustable by an operator of plasma system 10. Accordingly, power source 12 does not require a "GAS/AIR SET" operating mode wherein gas is allowed to flow and the power supply is disabled. Furthermore, the preset nature of non-adjustable regulator 68 allows power source 12 to be constructed without a regulator adjustment means and a gas system condition indicator such as a pressure gauge. Furthermore, the absence of the pressure gauge and the adjustment means allows housing 82 to be constructed with less perforations than a plasma cutting system having an operator adjustable regulator and since the non-adjustable regulator can be positioned anywhere inside housing 82, the overall size of the plasma power source can be minimized.

Non-Adjustable regulator output 78 is fluidly connected to valve 70 which is operatively connected to plasma torch 16 via cable 18. A gas path 79 extends between non-adjustable regulator 68 and valve 70 and communicates the regulated non-adjustable flow of gas to valve 70. Valve 70 is also connected to controller 13 such that valve 70 is only opened to allow the operator a fixed flow of regulated gas from regulator outlet 78 upon actuation of trigger 31 of plasma torch 16. Providing an operator non-adjustable regulated flow of gas to plasma torch 16 allows plasma cutting system 10 to be quickly and repeatably configured to perform a desired plasma process with minimal operator configuration of power source 12. Furthermore, power source 12 prevents the unnecessary consumption of the plasma generating gas by preventing the unnecessary communication of plasma gas until the trigger 31 of torch 16 is activated.

If power source 12 includes optional mode selector switch 36, output mode selector switch 36 is operatively connected to controller 13. Alternatively, selector switch 36 could be connected directly to non-adjustable regulator 68. The position of mode selector switch 36 indicates an intended plasma process to be effectuated. If the intended plasma process is a gouging process, it is desirable to provide a lower gas flow than necessary for a cutting process. In this configuration, non-adjustable regulator 68 includes an alternate, or bypass gas path 84 which provides a reduced fixed gas flow for gouging operations as compared to gas path 79. Alternately, the regulator 68 could use the same output if an internal valve is integrated in regulator 68.

Such a construction allows power source 12 to provide a plurality of user non-adjustable regulated gas flows to torch 16. Similar to the operation of plasma system 10 when gas path 79 is utilized, valve 70 prevents the passage of plasma gas from gas path 84 to plasma torch 16 until trigger 31 is actuated. That is, gas delivery system 64 of plasma system 10 provides a first fixed gas flow via gas path 79 and a second fixed gas flow via gas path 84. Regardless of the selected operating mode of plasma system 10, plasma system 10 provides a fixed flow of plasma process gas that is preset to the selected plasma process. Bypass gas path 84 increases the functionality of plasma system without requiring additional operator interference or gas system adjustment.

Power source 12 provides a plasma system that is readily operable with minimal operator configuration of the power system and gas system. The prevention of operator interference with the gas system further provides a plasma cutting system having a gas system which is incorruptible by novice operators or operator mistake. Furthermore, the omission of the controls and gauges associated with allowing operator manipulation of gas delivery system 64 simplifies the construction of power source 12 by omitting the components necessary for such interaction and the integration of those components into the assembly of the power source. That is, the omission of the interaction components decreases the weight of the device, allows for a more compact assembly, and reduces the machining and assembly time necessitated by the inclusion of the components.

Therefore, one embodiment of the present invention includes a plasma cutting power source having an inverter disposed within a housing and configured to receive an input power and generate a plasma cutting power from the input power. The plasma cutting system includes a gas path having an inlet to receive compressed gas and an outlet connected to a torch. A non-adjustable regulator is fluidly connected in the gas path and enclosed within the housing. The non-adjustable regulator is configured to provide a fixed preset gas flow to the outlet.

Another embodiment of the present invention has a plasma cutting system which includes a power source having an inverter configured to generate a plasma arc power. An enclosure is positioned about the inverter and a gas delivery system is disposed within the enclosure. The gas delivery system is configured to provide a fixed regulated gas flow. A plasma torch is operatively connected to the power source and the gas delivery system and the gas delivery system is constructed to provide gas flow to the plasma torch when plasma arc power is provided to the plasma torch.

A further embodiment of the present invention, a method of controlling a plasma cutting system, includes the steps of powering an inverter to generate a plasma arc power receiving an operator desired plasma process request, and then setting a fixed gas flow from a gas source to a plasma torch wherein the fixed gas flow is statically regulated between the gas source and the plasma torch.

As one skilled in the art will fully appreciate, the heretofore description of a plasma cutting system is one example of a plasma cutting system according to the present invention. It is understood that torches having arc starting techniques other than that shown are envisioned and within the scope of the claims.

The present invention has been described in terms of the preferred embodiment, and it is recognized that equivalents, alternatives, and modifications, aside from those expressly stated, are possible and within the scope of the appending claims.

What is claimed is:

1. A plasma cutting power source comprising:
   a housing;
   an inverter disposed within the housing and configured to receive an input power and generate a plasma cutting power therefrom;
   a gas path having an inlet to receive compressed gas and an outlet connected to a torch;
   a non-adjustable regulator fluidly connected in the gas path and enclosed within the housing, the non-adjustable regulator configured to provide a fixed preset gas flow to the outlet; and
   a valve disposed in the gas path between the non-adjustable regulator and the outlet, wherein the valve communicates the fixed preset gas flow to the outlet only by actuation of a trigger of the plasma torch.

2. The plasma cutting power source of claim 1 further comprising an adjustable operating mode selector configured to provide a second fixed preset gas flow to the outlet upon actuation of the adjustable operating mode selector.

3. The plasma cutting power source of claim 2 wherein the fixed preset gas flow is for a cutting process and the second fixed preset gas flow is for a gouging process.

4. The plasma cutting power source of claim 2 wherein the fixed preset gas flow is greater than the second fixed preset gas flow.

5. The plasma cutting power source of claim 4 wherein the fixed preset gas flow is a cutting gas flow and the second fixed preset gas flow is a gouging gas flow.

6. The plasma cutting power source of claim 1 further comprising an air filter disposed in the gas path between the inlet and the non-adjustable regulator.

7. A plasma cutting system comprising:
   a power source having an inverter configured to generate a plasma arc power;
   an enclosure positioned about the inverter;
   a gas delivery system disposed within the enclosure and configured to provide a fixed regulated gas flow; and
   a plasma torch operatively connected to the power source and the gas delivery system, the gas delivery system constructed to provide gas flow to the plasma torch when plasma arc power is provided to the plasma torch;
   wherein the gas delivery system is configured to provide an alternate fixed regulated gas flow to the plasma torch and the alternate fixed regulated gas flow has a pressure that is different than a pressure of the fixed regulated gas flow.

8. The plasma cutting system of claim 7 wherein the pressure of the alternate fixed regulated gas flow is lower than the pressure of the fixed regulated gas flow and is for a gouging process.

9. The plasma cutting system of claim 7 further comprising an operator input operatively connected to the gas delivery system and constructed to configure the gas delivery system to provide one of the fixed regulated gas flow and the alternate fixed regulated gas flow.

10. The plasma cutting system of claim 7 wherein the gas delivery system includes a non-adjustable regulator constructed to generate the fixed regulated gas flow from a compressed gas flow.

11. The plasma cutting system of claim 10 wherein the non-adjustable regulator is completely surrounded by the enclosure.

12. The plasma cutting system of claim 7 further comprising a gas filter fluidly connected to the gas delivery system and constructed to filter gas supplied from a gas source.

13. The plasma cutting system of claim 7 wherein the gas delivery system further comprises a valve constructed to open to deliver the fixed regulated gas flow to the plasma torch only upon actuation of a trigger of the plasma torch.

14. A method of controlling a plasma cutting system comprising the steps of:
   powering an inverter to generate a plasma arc power;
   receiving an operator desired plasma process request;
   setting a fixed gas flow based on the operator desired plasma process request from a gas source to a plasma torch wherein the fixed gas flow is statically regulated within a housing of the inverter; and
   preventing setting the fixed gas flow from the gas source to the plasma torch when plasma arc power is communicated to the plasma torch.

15. The method of claim 14 further comprising the step of receiving a second operator desired plasma process request and setting a second fixed gas flow from the gas source to the plasma torch, the second fixed gas flow having a lower pressure than the fixed gas flow.

16. A plasma cutting system comprising:
   a power source having an inverter configured to generate a plasma arc power;
   an enclosure positioned about the inverter;
   a gas delivery system disposed within the enclosure and configured to provide a fixed regulated gas flow, wherein the gas delivery system includes a non-adjustable regulator constructed to generate the fixed regulated gas flow from a compressed gas flow; and
   a plasma torch operatively connected to the power source and the gas delivery system, the gas delivery system constructed to provide gas flow to the plasma torch when plasma arc power is provided to the plasma torch.

17. The plasma cutting system of claim 16 wherein the non-adjustable regulator is completely surrounded by the enclosure.

18. A plasma cutting system comprising:
   a power source having an inverter configured to generate a plasma arc power;
   an enclosure positioned about the inverter;
   a gas delivery system disposed within the enclosure and configured to provide a fixed regulated gas flow; and
   a plasma torch operatively connected to the power source and the gas delivery system, the gas delivery system constructed to provide gas flow to the plasma torch when plasma arc power is provided to the plasma torch;
   wherein the gas delivery system further comprises a valve constructed to open to deliver the fixed regulated gas flow to the plasma torch only upon actuation of a trigger of the plasma torch.

* * * * *